(12) United States Patent
Dube et al.

(10) Patent No.: US 11,200,512 B2
(45) Date of Patent: Dec. 14, 2021

(54) RUNTIME ESTIMATION FOR MACHINE LEARNING TASKS

(71) Applicant: International Business Machines Corporation, Armonk, NY (US)

(72) Inventors: Parijat Dube, Yorktown Heights, NY (US); Gauri Joshi, Pittsburgh, PA (US); Priya Ashok Nagpurkar, Ossining, NY (US); Stefania Costache, White Plains, NY (US); Diana Jeanne Arroyo, Austin, TX (US); Zehra Noman Sura, Yorktown Heights, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 677 days.

(21) Appl. No.: 15/901,430

(22) Filed: Feb. 21, 2018

(65) Prior Publication Data

US 2019/0258964 A1 Aug. 22, 2019

(51) Int. Cl.
*G06N 20/00* (2019.01)
*G06F 16/22* (2019.01)

(52) U.S. Cl.
CPC .......... *G06N 20/00* (2019.01); *G06F 16/22* (2019.01)

(58) Field of Classification Search
CPC ................. G06N 20/00; G06F 16/22
See application file for complete search history.

(56) References Cited

U.S. PATENT DOCUMENTS 7,577,632 B2 8/2009 Thompson et al.
7,770,157 B2 8/2010 Arnold et al.
(Continued)

FOREIGN PATENT DOCUMENTS

WO 2012005611 1/2012

OTHER PUBLICATIONS

Zhang, et al., SLAQ: Quality-Driven Scheduling For Distributed Machine Learning, SoCC'17 ACM Symposium On, Sep. 24-27, 2017, pp. 390-404.
Pumma, et al., A Runtime Estimation Framework For ALICE, Journal Of Future Generation Computer Systems, Jul. 20, 2017, 40 Pages, vol. 72.
Wu, et al., Predicting Query Execution Time: Are Optimizer Cost Models Really Unusable?, ICDE IEEE 29th International Conference On, Apr. 8, 2013, 18 Pages.
(Continued)

*Primary Examiner* — Beau D Spratt
(74) *Attorney, Agent, or Firm* — Amin, Turocy & Watson, LLP

(57) ABSTRACT

Techniques for estimating runtimes of one or more machine learning tasks are provided. For example, one or more embodiments described herein can regard a system that can comprise a memory that stores computer executable components. The system can also comprise a processor, operably coupled to the memory, and that can execute the computer executable components stored in the memory. The computer executable components can comprise an extraction component that can extract a parameter from a machine learning task. The parameter can define a performance characteristic of the machine learning task. Also, the computer executable components can comprise a model component that can generate a model based on the parameter. Further, the computer executable components can comprise an estimation component that can generate an estimated runtime of the machine learning task based on the model. The estimated runtime can define a period of time beginning at an initiation of the machine learning task and ending at a completion of the machine learning task.

20 Claims, 10 Drawing Sheets

(56) References Cited

U.S. PATENT DOCUMENTS

| | | | |
|---|---|---|---|
| 7,895,192 B2 | 2/2011 | Mehta et al. | |
| 8,261,283 B2 | 9/2012 | Tsafrir et al. | |
| 8,719,804 B2 | 5/2014 | Jain | |
| 9,058,216 B2 | 6/2015 | Frean et al. | |
| 9,618,919 B2 | 4/2017 | Viassolo et al. | |
| 2007/0294681 A1 | 12/2007 | Tuck et al. | |
| 2009/0077235 A1 | 3/2009 | Podila | |
| 2012/0131591 A1* | 5/2012 | Moorthi | H04L 67/10 718/104 |
| 2014/0136452 A1* | 5/2014 | Wellman | G06N 5/04 706/12 |
| 2016/0092765 A1* | 3/2016 | Chilimbi | G06N 3/084 706/25 |
| 2017/0109199 A1 | 4/2017 | Chen | |
| 2017/0116038 A1 | 4/2017 | Netto et al. | |
| 2017/0192825 A1* | 7/2017 | Biberman | H04L 67/1008 |
| 2017/0228222 A1 | 8/2017 | Boehm et al. | |
| 2017/0255877 A1 | 9/2017 | Cho et al. | |
| 2018/0099460 A1* | 4/2018 | Iverson | B29C 64/20 |
| 2018/0144251 A1* | 5/2018 | Chou | G06N 5/02 |
| 2018/0174047 A1* | 6/2018 | Bourdev | H04N 19/91 |
| 2019/0050378 A1* | 2/2019 | Novak | G06F 40/169 |

OTHER PUBLICATIONS

Da Silva, et al., Algorithms And Scheduling Techniques To Mange Resilience and Power Consumption in Distibuted Systems, Task Resource Consumption Prediction for Scientific Applications and Workflows, Jul. 6, 2015, 25 Pages, Dagstuhl, Germany.

Vasić, et al., DejaVu: Accelerating Resource Allocation in Virtualized Environments, ASPLOS'12, Mar. 3, 2012, 13 Pages.

Tumanov, et al., JamaisVu: Robust Scheduling with Auto-Estimated Job Runtimes, Parallel Data Laboratory Carnegie Mellon University, Sep. 2016, 25 Pages.

Chen, et al., Forming SPN-MapReduce Model for Estimation Job Execution Time in Cloud Computing, Wireless Personal Communications, Oct. 3, 2016, 29 Pages.

Wang, et al., Using Straggler Replication to Reduce Latency in Large-scale Parallel Computing, Performance Evaluation Review, Dec. 2015, pp. 7-11, vol. 43. No. 3.

Mel, et al., The NIST Definition of Cloud Computing, National Institute of Standards and Technology Special Publication 800-145, Sep. 2011, 7 Pages.

* cited by examiner

US 11,200,512 B2

RUNTIME ESTIMATION FOR MACHINE LEARNING TASKS

BACKGROUND

The subject disclosure relates to estimating a runtime for machine learning tasks, and more specifically, estimating the runtime based on historical data of previous machine learning tasks and/or monitoring of a machine learning task being performed.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatuses and/or computer program products that can estimate a runtime for machine learning tasks are described.

According to an embodiment, a system is provided. The system can comprise a memory that stores computer executable components. The system can further comprise a processor, operably coupled to the memory, and that can execute the computer executable components stored in the memory. The computer executable components can comprise an extraction component that can extract a parameter from a machine learning task. The parameter defines a performance characteristic of the machine learning task. Also, the computer executable components can comprise a model component that can generate a model based on the parameter. Further, the computer executable component can comprise an estimation component that can generate an estimated runtime of the machine learning task based on the model. The estimated runtime can define a period of time beginning at an initiation of the machine learning task and ending at a completion of the machine learning task.

According to an embodiment, a computer-implemented method is provided. The computer-implemented method can comprise extracting, by a system operatively coupled to a processor, a parameter from a machine learning task. The parameter can define a performance characteristic of the machine learning task. The computer-implemented method can further comprise generating, by the system, a model based on the parameter. Also, the computer-implemented method can comprise estimating, by the system, a runtime of the machine learning task based on the model. The runtime can define a period of time beginning at an initiation of the machine learning task and ending at a completion of the machine learning task According to an embodiment, a computer program product is provided. The computer program product can be for estimating a runtime of a machine learning task. The computer program product can comprise a computer readable storage medium having program instructions embodied therewith. The program instructions can be executable by a processor to cause the processor to extract a parameter from the machine learning task. The parameter can define a performance characteristic of the machine learning task. The program instructions can further cause the processor to generate a model based on the parameter. Additionally, the program instructions can cause the processor to estimate the runtime of the machine learning task based on the model. The runtime can define a period of time beginning at an initiation of the machine learning task and ending at a completion of the machine learning task.

DETAILED DESCRIPTION

Figure 1:
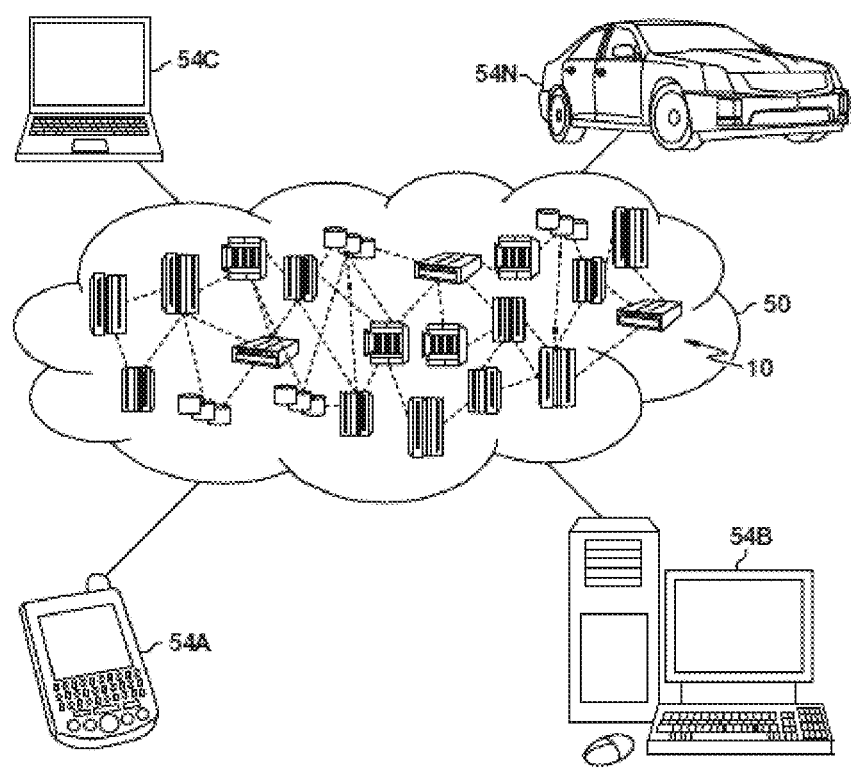
FIG. 1 depicts a cloud computing environment in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
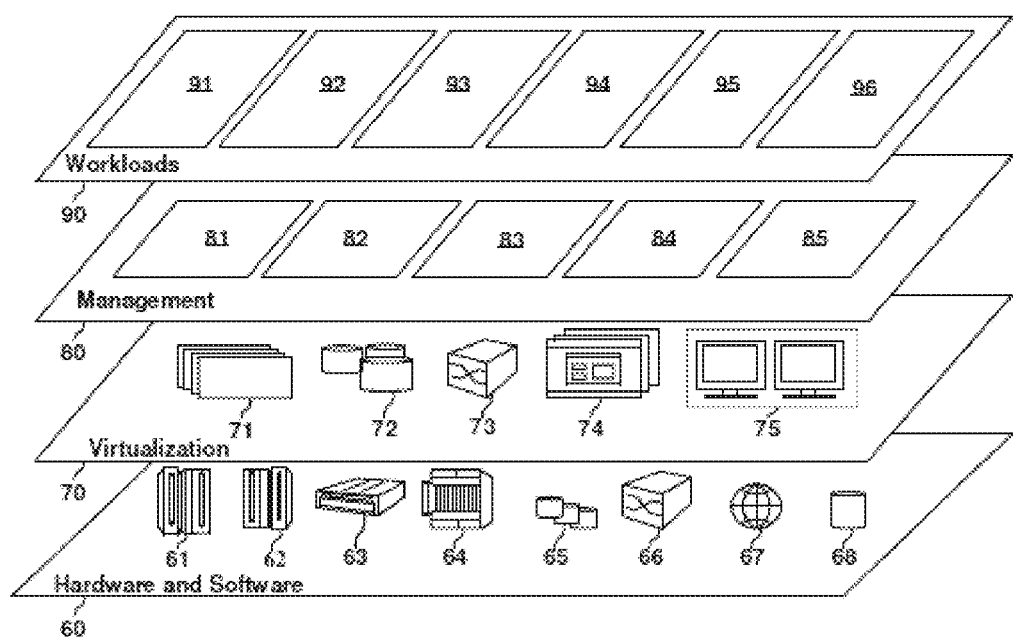
FIG. 2 depicts abstraction model layers in accordance with one or more embodiments described herein.

Referring now to FIG. 2, a set of functional abstraction layers provided by cloud computing environment 50 (FIG. 1) is shown. Repetitive description of like elements employed in other embodiments described herein is omitted for sake of brevity. It should be understood in advance that the components, layers, and functions shown in FIG. 2 are intended to be illustrative only and embodiments of the invention are not limited thereto. As depicted, the following layers and corresponding functions are provided. Repetitive description of like elements employed in other embodiments described herein is omitted for sake of brevity.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and machine learning services 96. Various embodiments described herein can utilize the cloud computing environment described with reference to FIGS. 1 and 2 to perform one or more machine learning tasks. Additionally, one or more embodiments described herein can analyze one or more parameters of the cloud computing environment described with reference to FIGS. 1 and 2 to estimate a runtime for one or more machine learning tasks to be performed in the cloud environment.

Machine learning technologies enable computers and/or computer program products to make data-driven predictions and/or decisions without said predictions and/or decisions being explicitly programmed. For example, machine learning technologies can identify trends, patterns, and/or conditions (e.g., cause and effect outcomes) to facilitate supervised and/or unsupervised learning. Further, cloud environments can be utilized in conjunction with machine learning technologies. For example, cloud environments can offer complex computer systems and/or a vast pool of resources (e.g., a large number of processors, storage means, and/or access to data) to execute machine learning tasks. Cloud service providers can provide clients with a platform to execute machine learning tasks that could not otherwise be implemented due to demands such as: computational capacity, available storage, access to data, and/or general hardware requirements.

However, the resources of any cloud environment are not infinite, and thus distribution of said resources are managed by the service provider. One way, said cloud service providers can manage the distribution of cloud resources is through monetary fees associated with the execution of the client's desired machine learning task. For example, a client can be billed based on the machine learning task's runtime. As used herein, the term "runtime" can refer to a period of time beginning from an initiation of the machine learning task and ending with completion and/or termination of the machine learning task. As the runtime of a machine learning task increases, the cloud resources consumed by said machine learning task also increases, and thereby the cost for executing the machine learning task increases. Therefore, it is helpful to both the service provider and the client to know the runtime of a subject machine learning task. Service providers can utilize runtimes to optimize the distribution of resources within their cloud environment, and clients can utilize runtimes to manage their costs.

Various embodiments of the present invention can be directed to computer processing systems, computer-implemented methods, apparatus and/or computer program products that facilitate the efficient, effective, and autonomous (e.g., without direct human guidance) estimation of one or more machine learning task's runtimes. The computer processing systems, computer-implemented methods, apparatus and/or computer program products described herein estimate the runtime of a machine learning task while accounting for: various factors defining performance characteristics of the machine learning task (e.g., model, model framework, training dataset, testing dataset, training framework, hyperparameters, hardware resources), possible queueing in cloud computer environments 50 in which the machine learning task is executed (e.g., unavailability of resources and/or scheduling delays), and/or pre-emption in said cloud computing environments 50 supporting priority status associated with various machine learning tasks.

One or more embodiments described herein can regard estimating the runtime of a machine learning task based on at least historical data of completed machine learning tasks with the same or similar characteristics. For example, the runtime can be estimated prior to the machine learning task being executed in the cloud computing environment 50. Various embodiments described herein can regard estimating the runtime of a machine learning task based on at least one or more observations made from monitoring the machine learning task as it is being executed in the cloud environment. For example, a previously generated runtime estimate can be modified based on one or more observed performance characteristics of the cloud computing environment 50. Additionally, one or more embodiments described herein can regard estimating the runtime of a machine learning task based on at least a mock machine learning task defined by similar parameters as a subject machine learning task.

The computer processing systems, computer-implemented methods, apparatus and/or computer program products employ hardware and/or software to solve problems that are highly technical in nature (e.g., estimating the runtime of a machine learning task), that are not abstract and cannot be performed as a set of mental acts by a human. Estimating the runtime of a machine learning task can be an extremely complicated process that cannot be readily achieved by a human, or even a plurality of humans. For example, humans cannot account for the incredible volume of parameters that must be considered to estimate the runtime of a machine learning task. Nor can the mental acts of a human consider the available resources of a cloud environment and account for how various machine learning tasks utilizing the cloud environment will be affected by the consumption of said resources.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware based systems that perform the specified functions or acts or carry out combinations of special purpose hardware and computer instructions.

Figure 3:
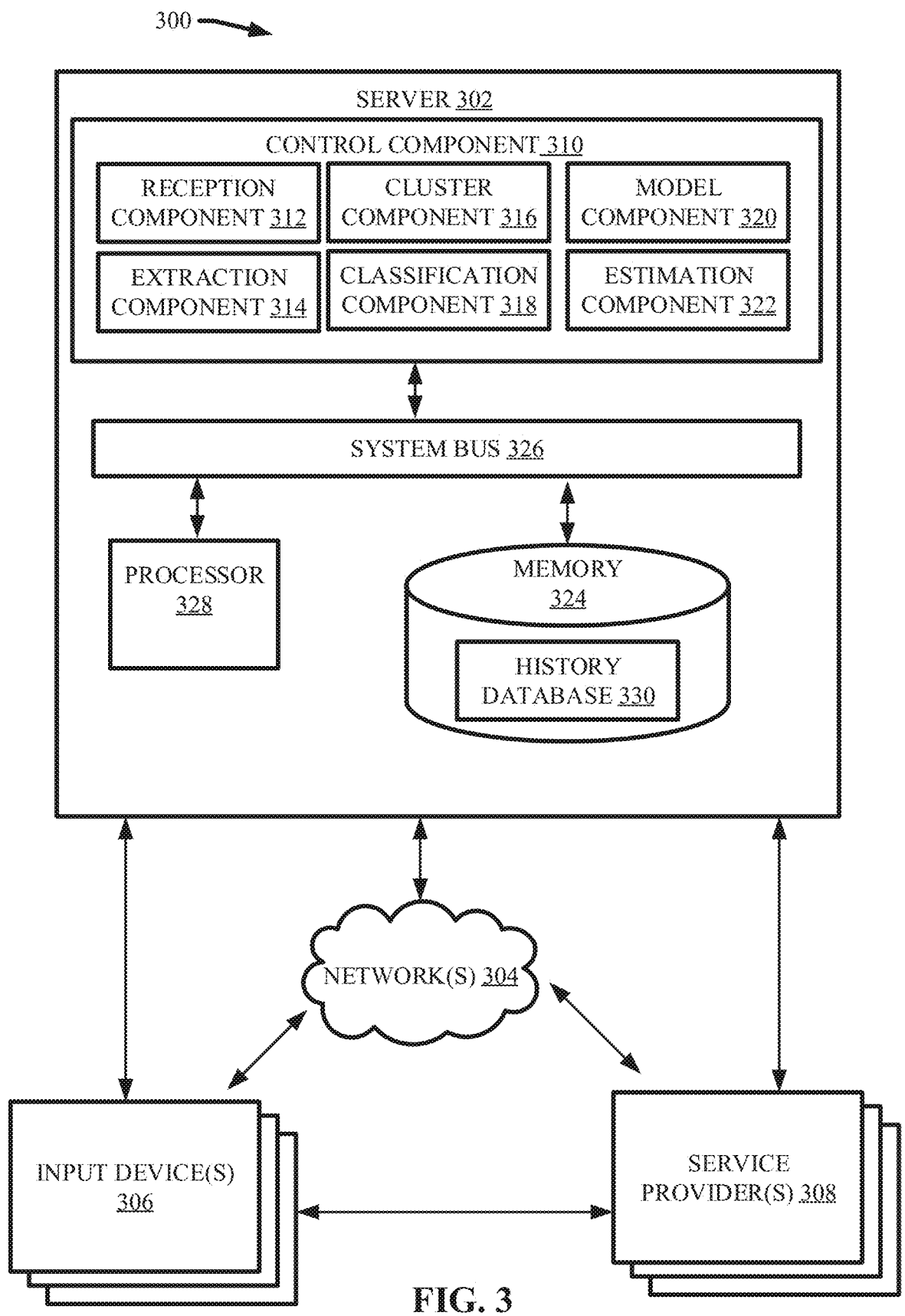
FIG. 3 illustrates a block diagram of an example, non-limiting system that can facilitate estimating a runtime of one or more machine learning tasks in accordance with one or more embodiments described herein.

FIG. 3 illustrates a block diagram of an example, non-limiting system 300 that can estimate a runtime of one or more machine learning tasks. Repetitive description of like elements employed in other embodiments described herein is omitted for sake of brevity. Aspects of systems (e.g., system 300 and the like), apparatuses or processes in various embodiments of the present invention can constitute one or more machine-executable components embodied within one or more machines, e.g., embodied in one or more computer readable mediums (or media) associated with one or more machines. Such components, when executed by the one or more machines, e.g., computers, computing devices, virtual machines, etc. can cause the machines to perform the operations described.

As shown in FIG. 3, the system 300 can comprise one or more servers 302, one or more networks 304, one or more input devices 306, and/or one or more service providers 308. The server 302 can comprise control component 310. The control component 310 can further comprise reception component 312, extraction component 314, cluster component 316, classification component 318, model component 320, and/or estimation component 322. Also, the server 302 can comprise or otherwise be associated with at least one memory 324. The server 302 can further comprise a system bus 326 that can couple to various components such as, but not limited to, the control component 310 and associated components, memory 324 and/or a processor 328. While a server 302 is illustrated in FIG. 3, in other embodiments, multiple devices of various types can be associated with or comprise the features shown in FIG. 3. Further, the server 302 can communicate with the cloud environment depicted in FIGS. 1 and 2 via the one or more networks 304. Additionally, one or more components of server 302 can be located within the cloud environment depicted in FIGS. 1 and 2.

The one or more networks 304 can comprise wired and wireless networks, including, but not limited to, a cellular network, a wide area network (WAN) (e.g., the Internet) or a local area network (LAN). For example, the server 302 can communicate with the input device 306 and/or the service provider 308 (and vice versa) using virtually any desired wired or wireless technology including for example, but not limited to: cellular, WAN, wireless fidelity (Wi-Fi), Wi-Max, WLAN, Bluetooth technology, a combination thereof, and/or the like. Further, although in the embodiment shown the control component 310 can be provided on the one or more servers 302, it should be appreciated that the architecture of system 300 is not so limited. For example, the control component 310, or one or more components of control component 310, can be located at another computer device, such as another server device, a client device, etc.

The one or more input devices 306 can comprise one or more computerized devices, which can include, but are not limited to: personal computers, desktop computers 54B, laptop computers 54C, cellular telephones 54A (e.g., smart phones), computerized tablets (e.g., comprising a processor), smart watches, keyboards, touch screens, mice, a combination thereof, and/or the like. A user of the system 300 can utilize the one or more input devices 306 to input data into the system 300, thereby sharing (e.g., via a direct connection and/or via the one or more networks 304) said data with the server 302 and/or the one or more service providers 308. For example, the one or more input devices 306 can send data to the reception component 312 (e.g., via a direct connection and/or via the one or more networks 304). The data can regard one or more machine learning tasks to be executed by the one or more service providers 308 (e.g., in cloud computing environment 50). As used herein, the term "machine learning task" can refer to an application of artificial intelligence technologies to automatically learn and/or improve from an experience (e.g., training data) without explicit programming of the lesson learned and/or improved.

The one or more service providers 308 can comprise a collection of processors, computers, servers, hard drives, a combination thereof, and/or the like; which can facilitate execution of one or more machine learning tasks. For example, the one or more service providers 308 can manage one or more cloud computing environments 50 (e.g., as depicted in FIGS. 1 and/or 2) in which the one or more machine learning tasks can be conducted. In various embodiments, the one or more service providers 308 can access vast amounts of data and/or coordinate multiple computer systems to execute the one or more machine learning tasks. Example cloud services providers that can comprise the one or more service providers 308 described herein can include, but are not limited to: IBM WATSON MACHINE LEARING®, AMAZON SAGEMAKER®, GOOGLE CLOUD MACHINE LEARNING ENGINE®, and/or MICROSOFT AZURE®.

In one or more embodiments, the control component 310 can analyze the one or more machine learning tasks provided by the one or more input devices 306 prior to execution by the one or more service providers 308. The reception component 312 can receive one or more machine learning tasks inputted by a user of the system 300 via the one or more input devices 306. The reception component 312 can be operatively coupled to the one or more input devices 306 directly (e.g., via an electrical connection) or indirectly (e.g., via the one or more networks 304). Additionally, the reception component 312 can be operatively coupled to the one or more service providers 308 directly (e.g., via an electrical connection such as system bus 326) and/or indirectly (e.g., via the one or more networks 304).

The extraction component 314 can analyze data received by the reception component 312, which define the inputted one or more machine learning tasks. From said data, the extraction component 314 can extract one or more parameters that can define one or more performance characteristics of the one or more machine learning tasks. In other words, the one or more parameters can uniquely define the subject one or more machine learning tasks. For example, the extraction component 314 can extract one or more parameters that can include, but are not limited to: a model of the subject machine learning task, a model framework of the machine learning task, a dataset of the subject machine learning task, training framework regarding the subject machine learning task, resource configuration regarding the subject machine learning task, a combination thereof, and/or the like.

For example, one or more parameters regarding the model of the subject machine learning task can define: a model size, a number of layers in the model, a number of neurons per layer, interconnection topology of the model, a combination thereof, and/or the like. Additionally, one or more parameters regarding the model of the subject machine learning task can define the type of model, which can include, but is not limited to: deep belief networks ("DBNs"), convolutional neural networks ("CNNs"), and/or recurrent neural networks ("RNNs"). Additionally, the one or more extracted parameters can regard a framework of the machine learning task. The framework can be an interface, library, and/or tool that facilitates building the model of the machine learning task. Example frameworks can include, but are not limited to: CAFFE™, CAFFE2™, TORCH™, PYTORCH™, TENSORFLOW®, THEANO™, AMAZON MACHINE LEARNING™, APACHE SINGA™, TORCH™, BRAINSTORM™, APACHE MAHOUT™, and/or the like. Moreover, the one or more parameters can regard one or more datasets that can be utilized to train and/or test the machine learning task. For example, the one or more extracted parameters can regard the size and/or encoding of the one or more datasets. In addition, the one or more extracted parameters can regard a training framework for the machine learning task, such as: the number of nodes, the batch size, and/or the learning rate of the machine learning task. Further, the one or more extracted parameters can regard resource configuration (e.g., as defined by the one or more service providers 308) of a desired cloud computing environment 50 in which the subject machine learning task can be executed.

The memory 324 can store a meta-data that can regard various models, model frameworks, and/or training frameworks. Additionally, the memory 324 can store one or more history databases 330. The one or more history databases 330 can comprise data regarding previous machine learning tasks (e.g., previously completed machine learning tasks). For example, the one or more history databases 330 can comprise data regarding completed machine learning tasks, which can include, but are not limited to: final runtimes, performance characteristics, parameters (e.g., models, model framework, datasets, training frameworks, and/or resource configurations), training logs, associated model files (e.g., model definition files and/or task manifest files), a combination thereof, and/or the like.

The cluster component 316 can arrange the data stored in the memory 324 and/or the history database 330 into one or more clusters, wherein members of the same cluster have similar characteristics. For example, previous machine learning tasks can be grouped into a common cluster based on one or more parameters of the respective previous machine learning tasks. For instance, machine learning tasks of the same model, framework, runtime, and/or dataset can be grouped into one or more common clusters. Thus, the cluster component 316 can generate one or more clusters, wherein each cluster can comprise previous machine learning tasks that have one or more similar performance characteristics. The cluster component 316 can cluster the previous machine learning tasks based on any stored data regarding the previous machine learning tasks. Example clustering techniques that can be utilized by the cluster component 316 include, but are not limited to: portioning methods, hierarchical clustering, fuzzy clustering, density-based clustering, model-based clustering, a combination thereof, and/or the like.

In one or more embodiments, the cluster component 316 can further assign a previous machine learning task included in a cluster to be a cluster representative. In various embodiments, the cluster component 316 can generate cluster representative for one or more respective clusters based on the characteristics of the previous machine learning tasks included in the subject cluster. The cluster representative, whether assigned or created, can be characteristic of the previous machine learning tasks included in the subject cluster for which the cluster representative represents. For example, the cluster representative can comprise one or more parameters that are common to previous machine learning tasks comprising the subject cluster.

The classification component 318 can match the one or more machine learning tasks received by the reception component 312 with one or more previous machine learning tasks stored in the memory 324, and/or one or more clusters generated by the cluster component 316, based on the one or more extracted parameters. For example, wherein a subject machine learning task has been conducted in the past, the classification component 318 can match the subject machine learning task to the previous machine learning task with the same parameters. In another example, the classification component 318 can match a subject machine learning task to one or more previous machine learning task based on the one or more extracted parameters, wherein the subject machine learning task and the one or more previous machine learning tasks share one or more common parameters. In another example, the classification component 318 can match a subject machine learning task to one or more clusters and/or cluster representatives, wherein the cluster representative, and/or the members of the cluster, share one or more common parameters. In another example, wherein a subject machine learning task does not share any common parameters with a previous machine learning task, the classification component 318 can match the subject machine learning task to a previous machine learning task, cluster, and/or cluster representative having one or more parameters within a predefined difference from the extracted one or more parameters (e.g., within a tolerance value).

A user of the system 300 can determine a priority scheme of parameters that can be compared by the classification component 318. For example, a user of the system 300 can define the parameters (e.g., the extracted parameters and parameters stored in the memory 324 and associated with previous machine learning tasks) that are to be compared by the classification component 318. In another example, a user of the system 300 can assign respective weight (e.g., importance) to one or more parameters (e.g., the extracted parameters and parameters stored in the memory 324 and associated with previous machine learning tasks) over other parameters; thereby directing the classification component 318 to prioritize one or more parameters over other parameters when matching the subject machine learning task to historical data (e.g., previous machine learning tasks). Thus, the classification component 318 can match a subject machine learning task to a most similar previous machine learning task, cluster, and/or cluster representative to identify historical data (e.g., past parameters and/or results) that can be indicative of future performance regarding the subject machine learning task.

The model component 320 can generate one or more models based on the extracted parameters and/or the matched historical data (e.g., similar previous machine learning tasks). The one or more models can depict predicted performance of the subject machine learning task. For example, the one or more models can account for: various factors defining performance characteristics of the machine learning task (e.g., model, model framework, training dataset, testing dataset, training framework, hyperparameters, hardware resources), possible queueing in cloud computer environments 50 in which the machine learning task is executed (e.g., unavailability of resources and/or scheduling delays), and/or pre-emption in said cloud computing environments 50 supporting priority status associated with various machine learning tasks.

The estimation component 322 can estimate one or more runtimes for one or more subject machine learning tasks based on the one or more models. In various embodiments, the estimation component 322 can estimate the one or more runtimes prior to execution of the subject machine learning task on the cloud computing environment 50. For example, the estimation component 322 can estimate the one or more runtimes while being offline (e.g., not on the one or more networks 304) from the service provider 308. Further, in various embodiments the estimation component 322 can generate and/or assign one or more confidence values to the one or more estimated runtimes. The one or more confidence values can be based on an amount of similarity between the subject machine learning task and the historical data (e.g., previous machine learning tasks) used to generate the model.

Figure 4:
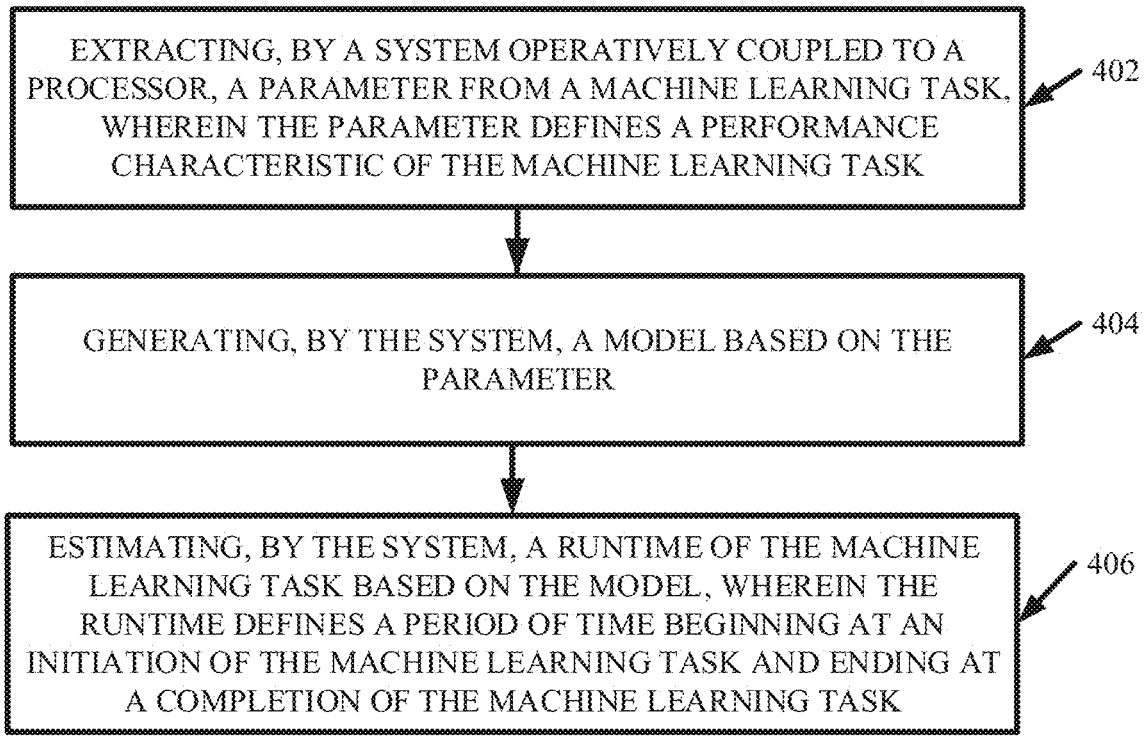
FIG. 4 illustrates a flow diagram of an example, non-limiting method that can facilitate estimating a runtime of one or more machine learning tasks based on historical data in accordance with one or more embodiments described herein.

FIG. 4 illustrates a flow diagram of an example, non-limiting method 400 that can facilitate utilizing the system 300 to estimate one or more runtimes for one or more machine learning tasks in accordance with one or more embodiments described herein. Repetitive description of like elements employed in other embodiments described herein is omitted for sake of brevity. In various embodiments, method 400 can comprise estimating the one or more runtimes based on historical data (e.g., previous machine learning tasks) prior to executing a subject machine learning task with one or more service providers 308. In one or more embodiments, the method 400 can comprise estimating the one or more runtimes based on one or more observations made while the machine learning task is being executed by the one or more service providers 308.

At 402, the method 400 can comprise extracting (e.g., via extraction component 314), by a system 300 operatively coupled to a processor 328, one or more parameters from a machine learning task. The one or more parameters can define one or more performance characteristics of the machine learning task. The machine learning task can be inputted into the system 300 via one or more input devices 306, and can be executed on a cloud computing environment 50 by one or more service providers 308. The one or more performance characteristics can regard any of the various factors discussed herein with regard to FIG. 3 (e.g., model, model framework, dataset, training data, training framework, resource configuration, a combination thereof, and/or the like).

At 404, the method 400 can comprise generating (e.g., via model component 320), by the system 300, one or more models based on the one or more extracted parameters. Additionally, the one or models can be generated based on historical data, such as previous machine learning tasks, associated with the subject machine learning task. The historical data can be grouped (e.g., via cluster component 316) into one or more clusters based on similarity of the historical data. Further, the historical data (e.g., one or more clusters) can be matched (e.g., via classification component 318) with the subject machine learning technology based on similarity between the subject machine learning task and the historical data. Furthermore, the one or more models can be generated based on operation data received by the one or more service providers 308, which can regard one or more operating conditions of the cloud computing environment 50 (e.g., the amount of machine learning tasks in the cloud computing environment 50 and/or queue times of the machine learning tasks).

At 406, the method 400 can comprise estimating (e.g., via estimation component 322), by the system 300, one or more runtimes of the machine learning task based on the one or more models generated at 404. The runtime can define a period of time beginning at an initiation of the machine learning task and ending at a completion of the machine learning task. Additionally, the method 400 can comprise assigning (e.g., via the estimation component 322) one or more confidence values to the one or more estimated runtimes. The one or more confidence values can be based on an amount of similarity between the subject machine learning task and the historical data (e.g., previous machine learning tasks) used to generate the model at 404.

Figure 5:
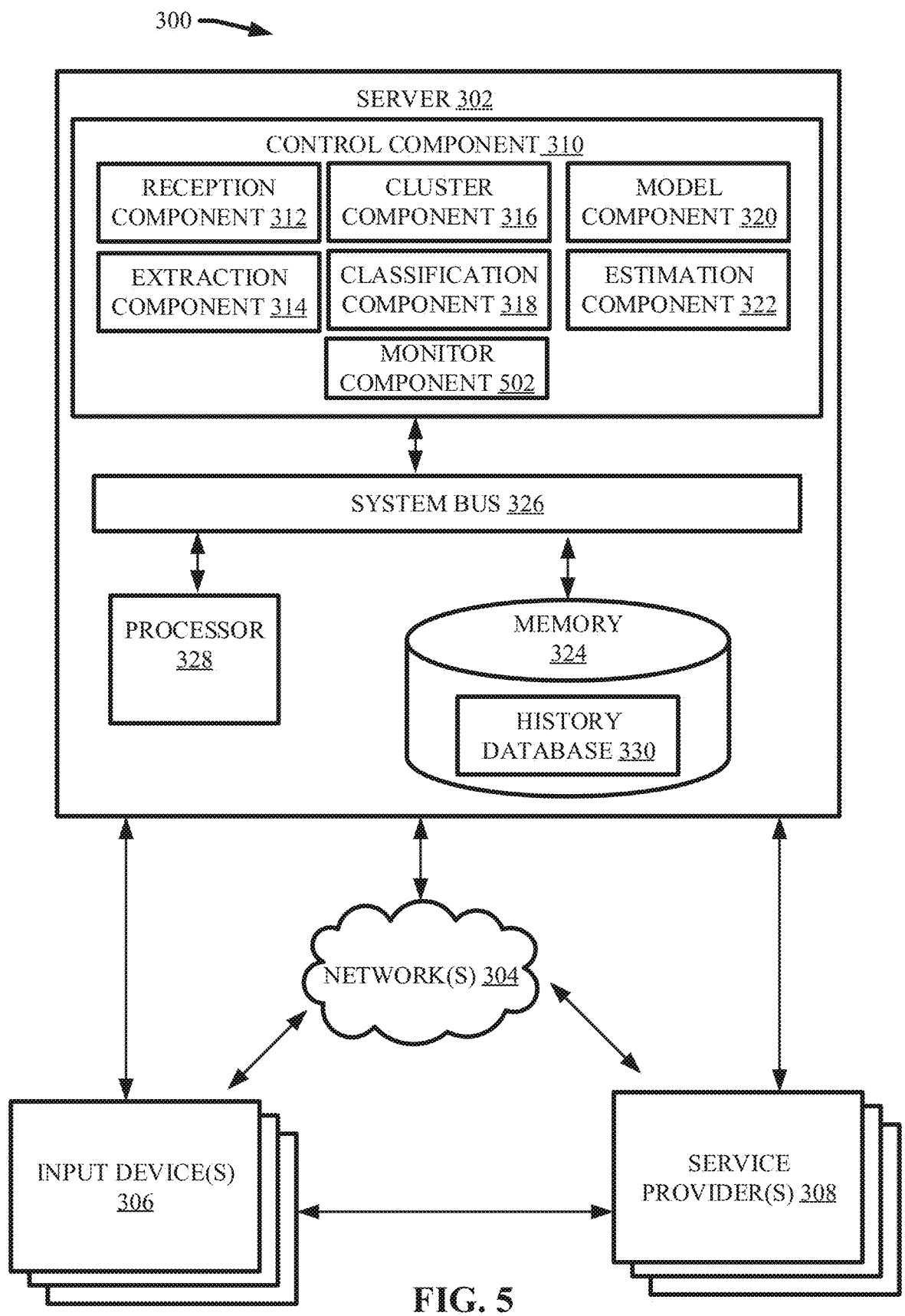
FIG. 5 illustrates a block diagram of an example, non-limiting system that can facilitate estimating a runtime of one or more machine learning tasks based on, for example, monitoring the one or more machine learning tasks during execution in accordance with one or more embodiments described herein.

FIG. 5 illustrates a block diagram of an example, non-limiting system 300 that can further comprise a monitor component 502 in accordance with one or more embodiments described herein. Repetitive description of like elements employed in other embodiments described herein is omitted for sake of brevity.

The monitor component 502 can monitor one or more operating conditions of the cloud computing environment 50 while the one or more machine learning tasks are executed by the one or more service providers 308 within the cloud computing environment 50. Example operating conditions can include, but are not limited to: the number of active machine learning tasks in the cloud computing environment 50, the size of active machine learning tasks in the cloud computing environment 50, the number of machine learning tasks queued in the cloud computing environment 50, scheduling variations (e.g., delays) in the cloud computing environment 50, maintenance issues regarding the cloud computing environment 50, processing power of the cloud computing environment 50, a combination thereof, and/or the like.

In one or more embodiments, the estimation component 322 can generate the one or more estimated runtimes based on the one or more extracted parameters and the one or more operating conditions monitored by the monitor component 502. In one or more embodiments, the estimation component 322 can update one or more generated estimated runtimes, which were generated based on the one or more extracted parameters and/or the one or more generated models, based on one or more operating conditions monitored by the monitor component 502. Thus, deviations from expected operating conditions (e.g., operating conditions existing during execution of previous machine learning tasks) can be accounted for by the estimation component 322. Similarly, in one or more embodiments the one or more models generated by model component 320 can be updated (e.g., by model component 320) based on the one or more operation conditions monitored by the monitor component 502. The monitor component 502 can monitor the operating conditions of the cloud computing environment 50 throughout the runtime of a subject machine learning task and/or outside of the runtime of the subject machine learning task.

Figure 6:
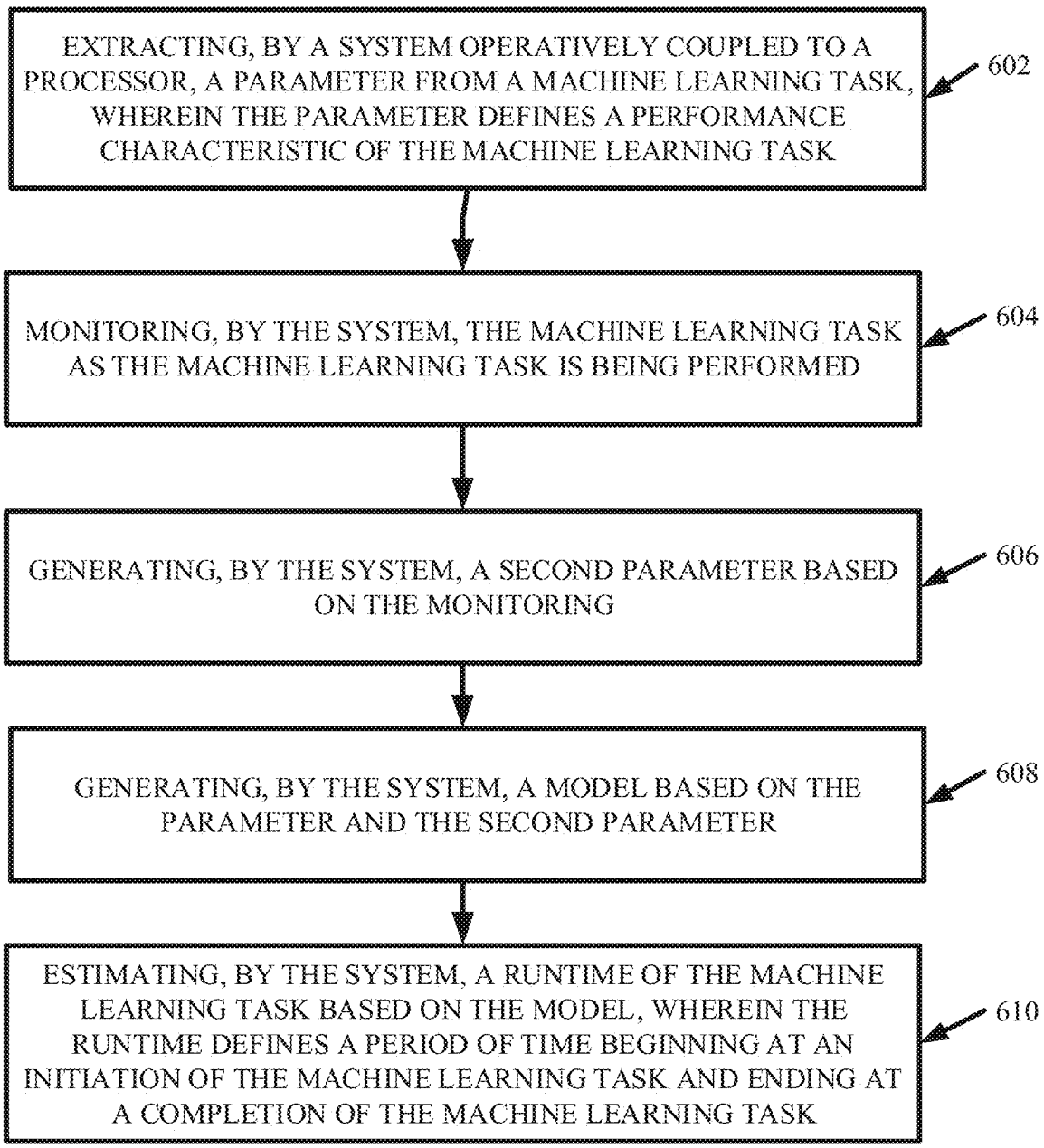
FIG. 6 illustrates a flow diagram of an example, non-limiting method that can facilitate estimating a runtime of one or more machine learning tasks based on, for example, monitoring the one or more machine learning tasks during execution in accordance with one or more embodiments described herein.

FIG. 6 illustrates a flow diagram of an example, non-limiting method 600 that can facilitate utilizing the system 300 to estimate one or more runtimes for one or more machine learning tasks in accordance with one or more embodiments described herein. Repetitive description of like elements employed in other embodiments described herein is omitted for sake of brevity. In various embodiments, method 600 can comprise estimating the one or more runtimes based on historical data (e.g., previous machine learning tasks) prior to executing a subject machine learning task with one or more service providers 308. In one or more embodiments, the method 600 can comprise estimating the one or more runtimes based on one or more observations made while the machine learning task is being executed by the one or more service providers 308.

At 602, the method 600 can comprise extracting (e.g., via extraction component 314), by a system 300 operatively coupled to a processor 328, one or more parameters from a machine learning task. The one or more parameters can define one or more performance characteristics of the machine learning task. The machine learning task can be inputted into the system 300 via one or more input devices 306, and can be executed on a cloud computing environment 50 by one or more service providers 308. The one or more performance characteristics can regard any of the various factors discussed herein with regard to FIG. 3 (e.g., model, model framework, dataset, training data, training framework, resource configuration, a combination thereof, and/or the like).

At 604, the method 600 can comprise monitoring (e.g., via monitor component 502), by the system 300, the one or more machine learning tasks as the one or more machine learning tasks are being performed. For example, the one or more machine learning tasks can be performed on one or more cloud computing environments 50 by the one or more service providers 308. At 606, the method 600 can comprise generating (e.g., via the monitor component 502), by the system 300, one or more second parameters based on the monitoring. For example, the one or more second parameters can regard one or more operating conditions of the one or more cloud computing environments 50 in accordance with the descriptions provided herein regarding FIG. 5.

At 608, the method 600 can comprise generating (e.g., via model component 320), by the system 300, one or more models based on the one or more extracted parameters and/or the one or more generated second parameters (e.g., monitored operating conditions). Additionally, the one or models can be generated based on historical data, such as previous machine learning tasks, associated with the subject machine learning task. The historical data can be grouped (e.g., via cluster component 316) into one or more clusters based on similarity of the historical data. Further, the historical data (e.g., one or more clusters) can be matched (e.g., via classification component 318) with the subject machine learning technology based on similarity between the subject machine learning task and the historical data. Furthermore, the one or more models can be generated based on operation data received by the one or more service providers 308, which can regard one or more operating conditions of the cloud computing environment 50 (e.g., such as the amount of machine learning tasks in the cloud computing environment 50 and/or queue times of the machine learning tasks).

At 610, the method 600 can comprise estimating (e.g., via estimation component 322), by the system 300, one or more runtimes of the machine learning task based on the one or more models generated at 608. The runtime can define a period of time beginning at an initiation of the machine learning task and ending at a completion of the machine learning task. Additionally, the method 600 can comprise assigning (e.g., via the estimation component 322) one or more confidence values to the one or more estimated runtimes. The one or more confidence values can be based on an amount of similarity between the subject machine learning task and the historical data (e.g., previous machine learning tasks) used to generate the model at 608.

While the steps of method 600 are illustrated in a particular order in FIG. 6, one of ordinary skill in the art will recognize that the method 600 can be practiced by the system 300 in one or more alternate orders. For example, in one or more embodiments the method 600 can comprise generating the one or more models (e.g., based on historical data) and/or estimating the one or more runtimes prior to monitoring the machine learning task and generating the second parameter, wherein the one or more models and/or estimated runtimes can be subsequently updated based on the one or more second parameters. Thus, a user of the system 300 can determine estimated runtimes prior to executing the subject machine learning task, and subsequently update said estimated runtimes based on observed operating conditions of the cloud computing environment 50. Alternatively, a user of the system 300 can wait to determine estimated runtimes until initiation of the machine learning task, whereupon the estimated runtime can be based on parameters of the machine learning task, operating conditions of the cloud computing environment 50, and/or historical data (e.g., previous machine learning tasks).

Figure 7:
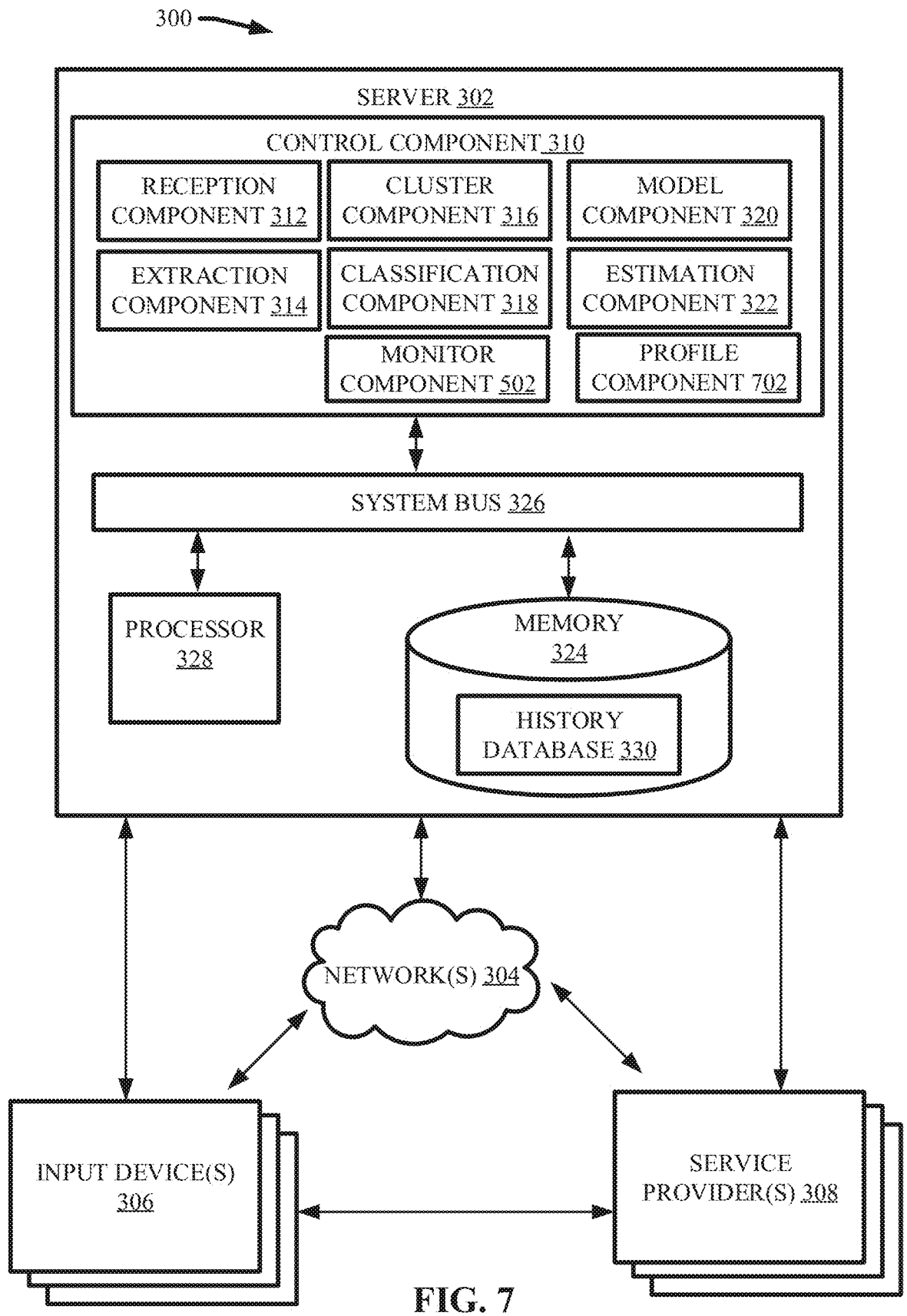
FIG. 7 illustrates a block diagram of an example, non-limiting system that can facilitate estimating a runtime of one or more machine learning tasks based on, for example, mock data to be processed under the same and/or similar parameters of the one or more machine learning tasks in accordance with one or more embodiments described herein.

FIG. 7 illustrates a block diagram of an example, non-limiting system 300 that can further comprise a profile component 702 in accordance with one or more embodiments described herein. Repetitive description of like elements employed in other embodiments described herein is omitted for sake of brevity.

The profile component 702 can generate one or more mock machine learning tasks. As used herein, the term "mock machine learning task" can refer to a fictional machine learning task created using fictional data. The fictional data can be the same and/or similar to the one or more extracted parameters. The profile component 702 can generate the one or more mock machine learning tasks and/or perform the mock machine learning tasks in order to derive insight as to one or more performance characteristics of a subject machine learning task. For example, wherein the subject machine learning task is not similar to any historical data in the memory 324, the profile component 702 can execute a mock machine learning task with similar parameters as the subject machine learning task so as to monitor performance characteristics. For instance, the mock machine learning task may comprise one or more of the same parameters as the subject machine learning task but require smaller training data (e.g., fewer iterations), thereby allowing the mock machine learning task to be completed more quickly. The model component 320 can generate the one or more models based on one or more parameters observed (e.g., by the profile component 702) from the mock machine learning trial.

In various embodiments, the profile component 702 can be utilized to bootstrap runtime estimates, especially for non-standard and/or custom-coded neural networks. The profile component 702 can generate and/or evaluate mock machine learning tasks prior to execution of a subject machine learning task and/or during execution of the machine learning task. For example, the profile component 702 can generate and/or evaluate a mock machine learning task based on one or more operating conditions observed by the monitor component 502. For instance, the profile component 702 can generate and/or evaluate one or more mock machine learning tasks periodically during execution of the machine learning task based on one or more operating conditions observed by the monitor component 502 in order to facilitate adapting the estimated runtime to dynamic conditions.

By generating and/or evaluating mock machine learning tasks having similar and/or same parameters as the subject machine learning parameter, the profile component 702 can output one or more reference runtimes to be utilized by the model component 320 and/or the estimation component 322. For example, the profile component 702 can generate a mock machine learning task based on a subject machine learning task, but with less iterations. Additionally, the profile component 702 can determine input data size for the machine learning job and generate fictional data. Further, the profile component 702 can execute the mock machine task to develop a reference runtime that can be used by the model component 320 and/or the estimation component 322 to project runtime estimates for different run configurations.

Figure 8:
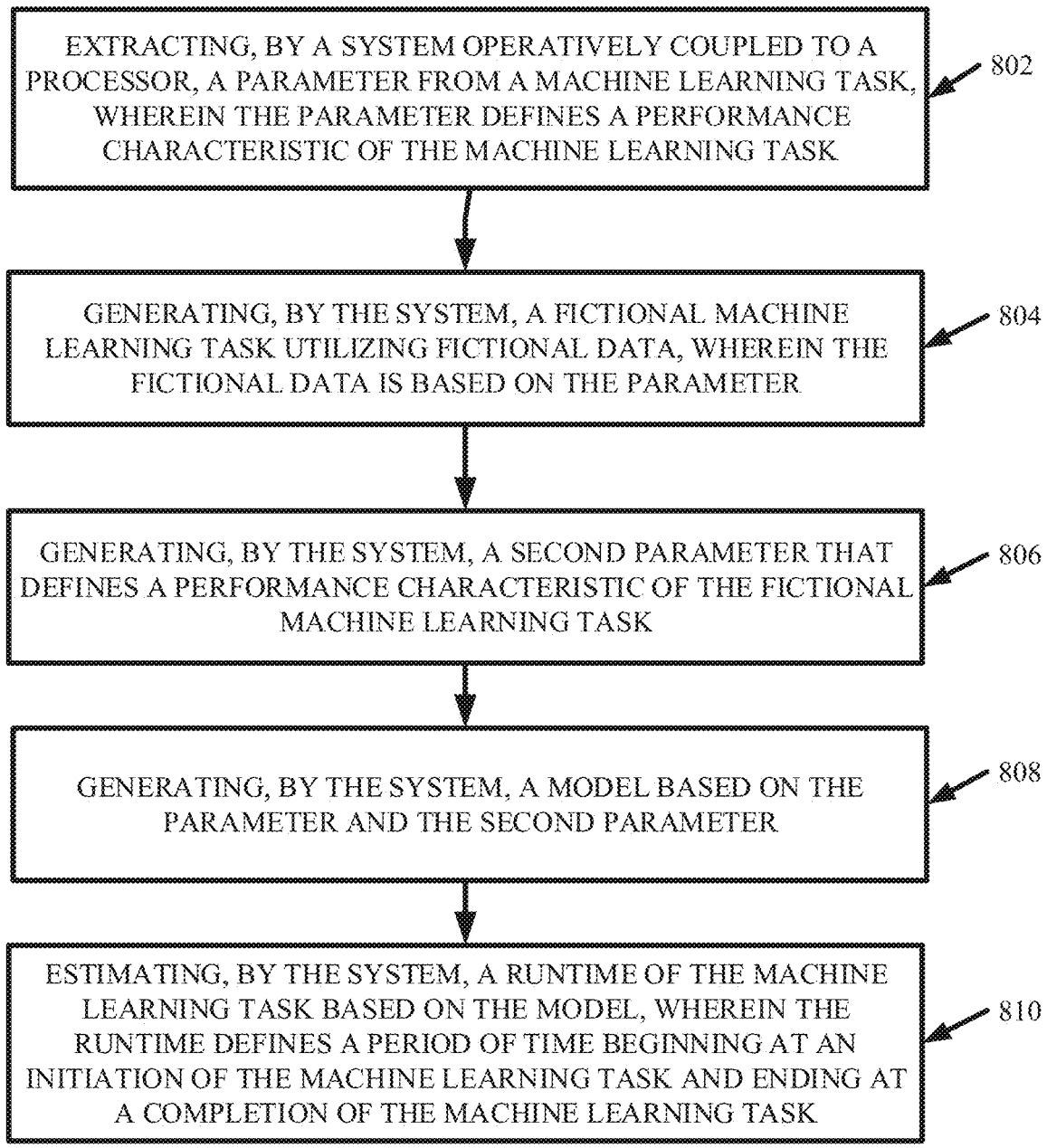
FIG. 8 illustrates a flow diagram of an example, non-limiting method that can facilitate estimating a runtime of one or more machine learning tasks based on, for example, mock data to be processed under the same and/or similar parameters of the one or more machine learning tasks in accordance with one or more embodiments described herein.

FIG. 8 illustrates a flow diagram of an example, non-limiting method 800 that can facilitate utilizing the system 300 to estimate one or more runtimes for one or more machine learning tasks in accordance with one or more embodiments described herein. Repetitive description of like elements employed in other embodiments described herein is omitted for sake of brevity. In various embodiments, method 800 can comprise estimating the one or more runtimes based on historical data (e.g., previous machine learning tasks) prior to executing a subject machine learning task with one or more service providers 308. In one or more embodiments, the method 800 can comprise estimating the one or more runtimes based on one or more observations made while the machine learning task is being executed by the one or more service providers 308.

At 802, the method 800 can comprise extracting (e.g., via extraction component 314), by a system 300 operatively coupled to a processor 328, one or more parameters from a machine learning task. The one or more parameters can define one or more performance characteristics of the machine learning task. The machine learning task can be inputted into the system 300 via one or more input devices 306, and can be executed on a cloud computing environment 50 by one or more service providers 308. The one or more performance characteristics can regard any of the various factors discussed herein with regard to FIG. 3 (e.g., model, model framework, dataset, training data, training framework, resource configuration, a combination thereof, and/or the like).

At 804, the method 800 can comprise generating (e.g., via the profile component 702), by the system 300, a fictional machine learning task (e.g., a mock machine learning task) utilizing fictional data, which can be based on the one or more extracted parameters. For example, the fictional machine learning task can be similar to the subject machine learning task and/or the fictional data can be similar to the one or more extracted parameters. At 806, the method 800 can comprise generating (e.g., via the profile component 702), by the system 300, one or more second parameters that can define one or more performance characteristics of the fictional machine learning task. For example, the second parameter can be a reference runtime for the fictional machine learning task.

At 808, the method 800 can comprise generating (e.g., via model component 320), by the system 300, one or more models based on the one or more extracted parameters and/or the one or more generated second parameters (e.g., monitored operating conditions). Additionally, the one or models can be generated based on historical data, such as previous machine learning tasks, associated with the subject machine learning task. The historical data can be grouped (e.g., via cluster component 316) into one or more clusters based on similarity of the historical data. Further, the historical data (e.g., one or more clusters) can be matched (e.g., via classification component 318) with the subject machine learning technology based on similarity between the subject machine learning task and the historical data. Furthermore, the one or more models can be generated based on operation data received by the one or more service providers 308, which can regard one or more operating conditions of the cloud computing environment 50 (e.g., such as the amount of machine learning tasks in the cloud computing environment 50 and/or queue times of the machine learning tasks). In addition, the one or more models can be generated based on operation data observed by monitor component 502.

At 810, the method 800 can comprise estimating (e.g., via estimation component 322), by the system 300, one or more runtimes of the machine learning task based on the one or more models generated at 808. The runtime can define a period of time beginning at an initiation of the machine learning task and ending at a completion of the machine learning task. Additionally, the method 800 can comprise assigning (e.g., via the estimation component 322) one or more confidence values to the one or more estimated runtimes. The one or more confidence values can be based on an amount of similarity between the subject machine learning task and the historical data (e.g., previous machine learning tasks) used to generate the model at 808.

While the steps of method 800 are illustrated in a particular order in FIG. 8, one of ordinary skill in the art will recognize that the method 800 can be practiced by the system 300 in one or more alternate orders. For example, in one or more embodiments the method 800 can comprise generating the one or more models (e.g., based on historical data) and/or estimating the one or more runtimes prior to generating the fictional machine learning task and/or second parameter, wherein the one or more models and/or estimated runtimes can be subsequently updated based on the one or more second parameters. Thus, a user of the system 300 can determine estimated runtimes prior to executing the subject machine learning task, and subsequently update said estimated runtimes based on observed operating conditions of similar mock machine learning tasks. Alternatively, a user of the system 300 can wait to determine estimated runtimes until initiation of the machine learning task, whereupon the estimated runtime can be based on parameters of the machine learning task, operating conditions of the cloud computing environment 50, historical data (e.g., previous machine learning tasks), and/or mock machine learning tasks (e.g., which in turn can be based on observed operational conditions of the cloud computing environment 50).

Figure 9:
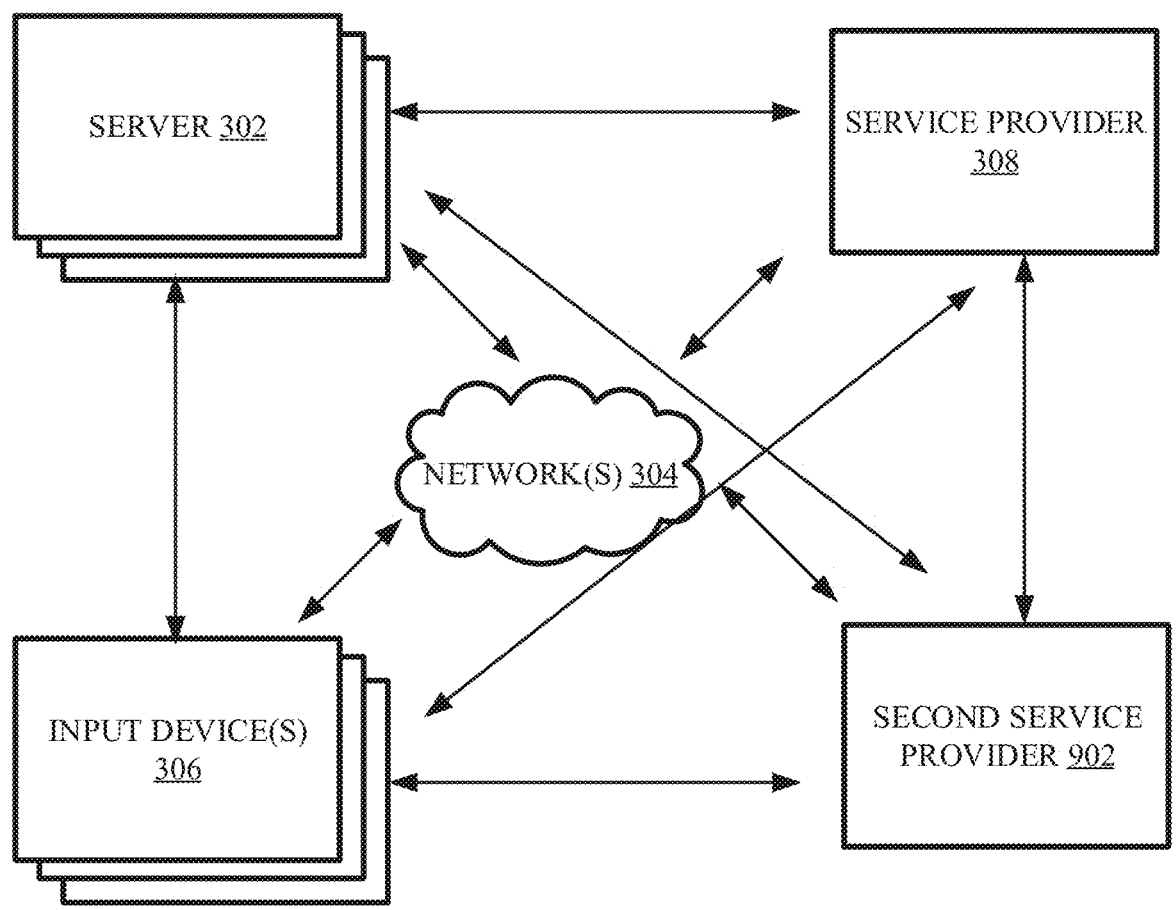
FIG. 9 illustrates a block diagram of an example, non-limiting system that can facilitate estimating a runtime of one or more machine learning tasks in accordance with one or more embodiments described herein.

FIG. 9 illustrates a block diagram of example, non-limiting system 300 comprising one or more second service providers 902 in accordance with one or more embodiments described herein. Repetitive description of like elements employed in other embodiments described herein is omitted for sake of brevity. The second service provider 902 can have equivalent features and/or perform equivalent functions as the one or more service providers 308.

In various embodiments, the monitor component 502 can monitor operational conditions facilitated by both the one or more service providers 308 and/or the one or more second service providers 902. Thus, the system 300 (e.g., via the model component 320, the estimation component 322, and/or the profile component 702) can generate estimated runtimes for respective cloud service providers. Thereby, a user of the system 300 can select a cloud service provider (e.g., the one or more service providers 308 and/or the one or more second service providers 902) that will optimize the runtime, efficiency, and/or economics of a subject machine learning task. In other words, wherein multiple cloud service providers exist, a user can utilize the system 300 as a tool to select the most ideal cloud service provider for a subject machine learning task at a subject time.

The system 300 and various methods (e.g., 400, 600, and/or 800) described herein can be utilized to the advantage of end-users of a machine learning task and/or cloud service providers (e.g., one or more service providers 308 and/or second service providers 902). For example, end-users of a machine learning task can utilize the various embodiments described herein to: compare difference resource configuration options before submitting a machine learning task in order to obtain trade-offs regarding price and/or performance of the machine learning task, monitor remaining runtime of a machine learning task, and/or auto-scale active machine learning tasks based on remaining runtime estimates. In another example, cloud service providers can utilize the various embodiments described herein to: differentiate among job containers to be preempted by accounting for the demand of a machine learning task, wherein the demand can be defined by the number of requested resources and runtime associated with a subject machine learning task; differentiate among machine learning tasks that could be preempted when there is not enough cloud capacity by assigning bid values to machine learning jobs (e.g., to avoid preemption of jobs that are close to completion); and/or provide updated runtime estimates for current resource configurations and other possible scaling options.

Figure 10:
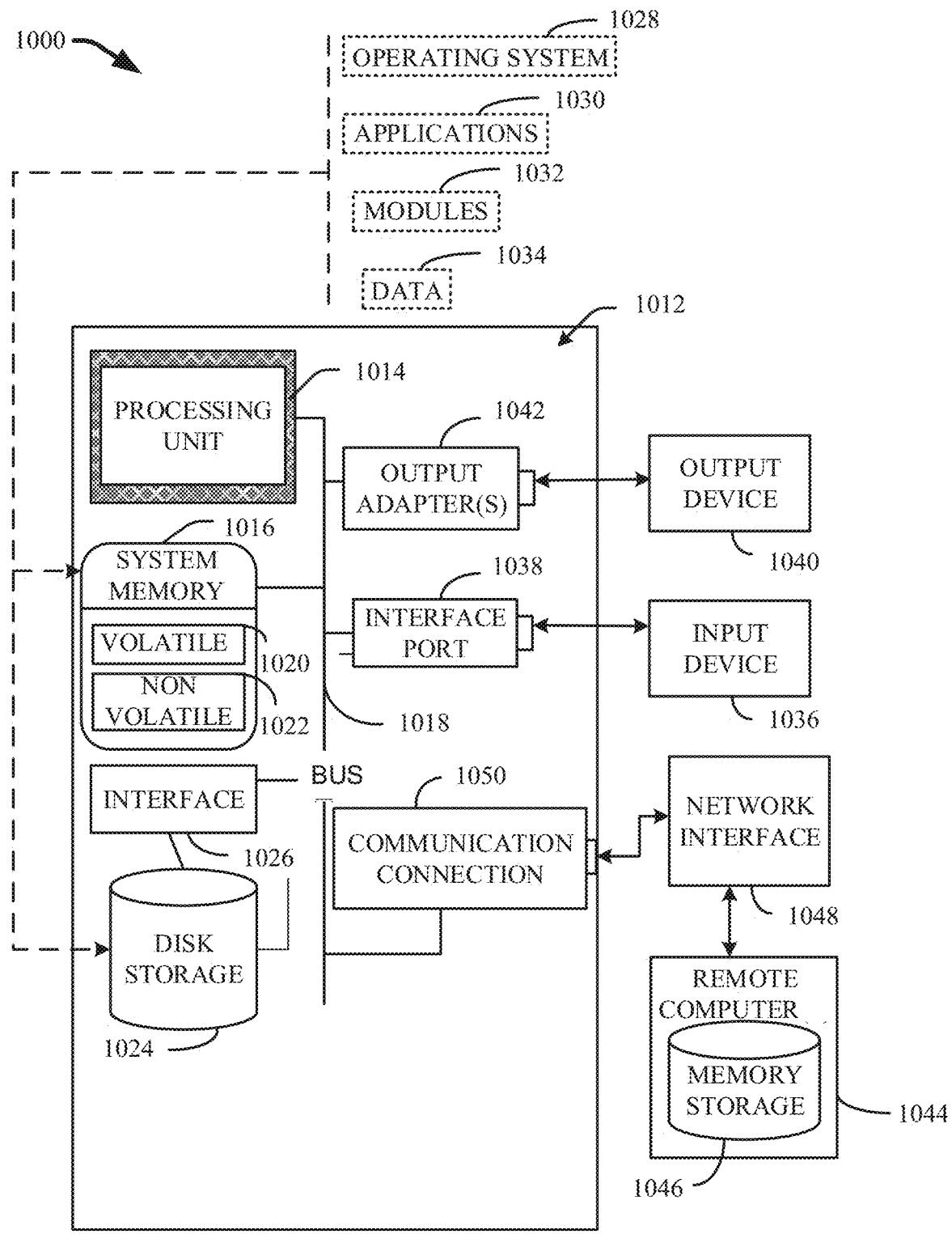
FIG. 10 illustrates a block diagram of an example, non-limiting operating environment in which one or more embodiments described herein can be facilitated.

In order to provide a context for the various aspects of the disclosed subject matter, FIG. 10 as well as the following discussion are intended to provide a general description of a suitable environment in which the various aspects of the disclosed subject matter can be implemented. FIG. 10 illustrates a block diagram of an example, non-limiting operating environment in which one or more embodiments described herein can be facilitated. Repetitive description of like elements employed in other embodiments described herein is omitted for sake of brevity. With reference to FIG. 10, a suitable operating environment 1000 for implementing various aspects of this disclosure can include a computer 1012. The computer 1012 can also include a processing unit 1014, a system memory 1016, and a system bus 1018. The system bus 1018 can operably couple system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structures including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire, and Small Computer Systems Interface (SCSI). The system memory 1016 can also include volatile memory 1020 and nonvolatile memory 1022. The basic input/output system (BIOS), containing the basic routines to transfer information between elements within the computer 1012, such as during start-up, can be stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), flash memory, or nonvolatile random-access memory (RAM) (e.g., ferroelectric RAM (FeRAM). Volatile memory 1020 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1012 can also include removable/non-removable, volatile/non-volatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1024 to the system bus 1018, a removable or non-removable interface can be used, such as interface 1026. FIG. 10 also depicts software that can act as an intermediary between users and the basic computer resources described in the suitable operating environment 1000. Such software can also include, for example, an operating system 1028. Operating system 1028, which can be stored on disk storage 1024, acts to control and allocate resources of the computer 1012. System applications 1030 can take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through one or more input devices 1036. Input devices 1036 can include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices can connect to the processing unit 1014 through the system bus 1018 via one or more interface ports 1038. The one or more Interface ports 1038 can include, for example, a serial port, a parallel port, a game port, and a universal serial bus (USB). One or more output devices 1040 can use some of the same type of ports as input device 1036. Thus, for example, a USB port can be used to provide input to computer 1012, and to output information from computer 1012 to an output device 1040. Output adapter 1042 can be provided to illustrate that there are some output devices 1040 like monitors, speakers, and printers, among other output devices 1040, which require special adapters. The output adapters 1042 can include, by way of illustration and not limitation, video and sound cards that provide a means of connection between the output device 1040 and the system bus 1018. It should be noted that other devices and/or systems of devices provide both input and output capabilities such as one or more remote computers 1044.

Computer 1012 can operate in a networked environment using logical connections to one or more remote computers, such as remote computer 1044. The remote computer 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer 1044. Remote computer 1044 can be logically connected to computer 1012 through a network interface 1048 and then physically connected via communication connection 1050. Further, operation can be distributed across multiple (local and remote) systems. Network interface 1048 can encompass wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). One or more communication connections 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

Embodiments of the present invention can be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various aspects of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device including, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components including a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems, computer program products and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
    a memory that stores computer executable components;
    a processor, operably coupled to the memory, and that executes the computer executable components stored in the memory, wherein the computer executable components comprise:
        an extraction component that extracts a parameter from a machine learning task, wherein the parameter defines a performance characteristic of the machine learning task;
        a monitoring component that monitors one or more operating conditions of a cloud computing environment while one or more machine learning tasks are executed;
        a model component that generates a model based on the parameter, and respective runtimes times for at least one completed machine learning task of the one or more machine learning tasks, wherein the at least one completed machine learning task does not comprise the machine learning task; and
        an estimation component that:
            generates an estimated runtime of the machine learning task based on the model and the one or more operating conditions, wherein the estimated runtime defines a period of time beginning at an initiation of the machine learning task and ending at a completion of the machine learning task, and
            assigns a confidence score to the estimated runtime, wherein the confidence score is based upon an amount of similarity of the machine learning task to the at least one completed machine learning task.

2. The system of claim 1, further comprising a database having historical data regarding the respective runtimes of the at least one completed machine learning task.

3. The system of claim 2, wherein the at least one completed machine learning task comprises a plurality of completed machine learning tasks, and further comprising:
    a clustering component that generates a cluster of completed machine learning tasks of the plurality of completed machine learning tasks based on respective performance characteristics of the plurality of completed machine learning tasks, wherein the clustering component further generates a representative parameter that characterizes the cluster of completed machine learning tasks, wherein the model is further based on the representative parameter.

4. The system of claim 3, further comprising a classification component that matches the machine learning task to the cluster of completed machine learning tasks based on the parameter and the representative parameter.

5. The system of claim 1, wherein the machine learning task is performed in the cloud environment, and wherein the model is further based on a second parameter that defines a second performance characteristic of the cloud environment.

6. The system of claim 5, wherein the estimation component generates the estimated runtime prior to the machine learning task being performed in the cloud environment.

7. The system of claim 1, wherein the monitoring component further monitors the machine learning task as the machine learning task is being performed and generates a second parameter based on the monitoring, wherein the model is further based on the second parameter.

8. The system of claim 7, wherein the machine learning task is performed in a cloud environment, and wherein the estimation component generates the estimated runtime while the machine learning task is being performed in the cloud environment.

9. The system of claim 8, wherein the monitoring component further generates a third parameter that defines a second performance characteristic of the cloud environment, and wherein the model is further based on the third parameter.

10. The system of claim 1, further comprising a profile component that generates a fictional machine learning task utilizing fictional data, wherein the fictional data is based on the parameter, wherein the profile component further generates a second parameter that defines a performance characteristic of the fictional machine learning task.

11. The system of claim 10, wherein the model is further based on the second parameter.

12. A computer-implemented method, comprising:
    extracting, by a system operatively coupled to a processor, a parameter from a machine learning task, wherein the parameter defines a performance characteristic of the machine learning task;
    monitoring, by the system, one or more operating conditions of a cloud computing environment while one or more machine learning tasks are executed;
    generating, by the system, a model based on the parameter and respective runtimes times for at least one completed machine learning task of the one or more machine learning tasks, wherein the at least one completed machine learning task does not comprise the machine learning task;
    estimating, by the system, a runtime of the machine learning task based on the model and the one or more operating conditions, wherein the runtime defines a period of time beginning at an initiation of the machine learning task and ending at a completion of the machine learning task, and
    assigning, by the system, a confidence score to the estimated runtime, wherein the confidence score is based upon an amount of similarity of the machine learning task to the at least one completed machine learning task.

13. The computer-implemented method of claim 12, wherein the at least one completed machine learning task comprises a plurality of completed machine learning tasks, and further comprising:

generating, by the system, a cluster of completed machine learning tasks of the plurality of completed machine learning tasks based on respective performance characteristics of the plurality of completed machine learning tasks; and generating, by the system, a representative parameter that characterizes the cluster of completed machine learning tasks, wherein the model is further based on the representative parameter.

14. The computer-implemented method of claim 13, further comprising matching, by the system, the machine learning task to the cluster of completed machine learning tasks based on the parameter and the representative parameter.

15. The computer-implemented method of claim 12, further comprising monitoring, by the system, the machine learning task as the machine learning task is being performed; and generating, by the system, a second parameter based on the monitoring, wherein the model is further based on the second parameter.

16. The computer-implemented method of claim 15, wherein the machine learning task is performed in the cloud environment, and wherein the estimating is performed while the machine learning task is being performed in the cloud environment.

17. The computer-implemented method of claim 12, further comprising:

generating, by the system, a fictional machine learning task utilizing fictional data, wherein the fictional data is based on the parameter; and generating, by the system, a second parameter that defines a performance characteristic of the fictional machine learning task, wherein the model is further based on the second parameter.

18. A computer program product for estimating a runtime of a machine learning task, the computer program product comprising a non-transitory computer readable medium having program instructions embodied therewith, the program instructions executable by a processor to cause the processor to:

extract a parameter from the machine learning task, wherein the parameter defines a performance characteristic of the machine learning task;

monitor one or more operating conditions of a cloud computing environment while one or more machine learning tasks are executed;

generate a model based on the parameter and respective runtimes times for at least one completed machine learning task of the one or more machine learning tasks, wherein the at least one completed machine learning task does not comprise the machine learning task; and estimate the runtime of the machine learning task based on the model and the one or more operating conditions, wherein the runtime defines a period of time beginning at an initiation of the machine learning task and ending at a completion of the machine learning task, and assign a confidence score to the estimated runtime, wherein the confidence score is based upon an amount of similarity of the machine learning task to the at least one completed machine learning task.

19. The computer program product of claim 18, wherein the at least one completed machine learning task comprises a plurality of completed machine learning tasks, and the program instructions further cause the processor to:

generate a cluster of completed machine learning tasks from the plurality of completed machine learning tasks based on respective performance characteristics of the plurality of completed machine learning tasks;

generate a representative parameter that characterizes the cluster of completed machine learning tasks; and match the machine learning task with the cluster of completed machine learning tasks, wherein the model is further based on the representative parameter.

20. The computer program product of claim 18, wherein the program instructions further cause the processor to:

monitor the machine learning task as the machine learning task is being performed; and generate a second parameter based on the monitor, wherein the model is further based on the second parameter.

* * * * *